United States Patent
Tsai

(10) Patent No.: US 9,617,730 B1
(45) Date of Patent: Apr. 11, 2017

(54) ADAPTIVE BEARING ENERGY ABSORBER

(71) Applicant: Chong-Shien Tsai, Taichung (TW)

(72) Inventor: Chong-Shien Tsai, Taichung (TW)

( * ) Notice: Subject to any disclaimer, the term of this patent is extended or adjusted under 35 U.S.C. 154(b) by 0 days.

(21) Appl. No.: 14/954,199

(22) Filed: Nov. 30, 2015

(51) Int. Cl.
  *E04B 1/98* (2006.01)
  *F16F 13/04* (2006.01)

(52) U.S. Cl.
  CPC .............. *E04B 1/98* (2013.01); *F16F 13/04* (2013.01); *F16F 2236/123* (2013.01); *F16F 2238/045* (2013.01)

(58) Field of Classification Search
  CPC ....... E01D 19/047; E01D 19/041; E04B 1/98; E02D 27/43; E04H 9/022
  USPC ............... 267/140.3, 140.4, 141.1; 52/167.1, 52/167.7, 167.8
  See application file for complete search history.

(56) References Cited

U.S. PATENT DOCUMENTS

| | | | | |
|---|---|---|---|---|
| 4,152,799 A | * | 5/1979 | Koster ................ | E01D 19/047 14/73.5 |
| 4,499,694 A | * | 2/1985 | Buckle .................... | E04B 1/98 52/167.7 |
| 4,599,834 A | * | 7/1986 | Fujimoto ................ | E02D 27/34 376/285 |
| 4,713,917 A | * | 12/1987 | Buckle .................. | E01D 19/041 248/565 |
| 4,899,323 A | * | 2/1990 | Fukahori ................... | E04B 1/36 248/560 |
| 5,201,155 A | * | 4/1993 | Shimoda ............... | E01D 19/041 248/634 |
| 5,655,756 A | * | 8/1997 | Robinson ................ | E04H 9/022 267/140.2 |
| 7,856,766 B2 | * | 12/2010 | Takenoshita ............ | E04H 9/022 248/636 |
| 2013/0334749 A1 | * | 12/2013 | Tsai .......................... | E04B 1/98 267/140.11 |

\* cited by examiner

*Primary Examiner* — Christopher Schwartz
(74) *Attorney, Agent, or Firm* — Rosenberg, Klein & Lee

(57) ABSTRACT

An adaptive bearing energy absorber has at least one core post, two supporting boards, multiple first material layers, and multiple second material layers. Each one of the at least one core post is composed of at least one sliding unit. At least one of the at least one sliding unit of each one of the at least one core post is a sliding assembly. Each one of the at least one sliding assembly has two ends, at least one sliding block, and at least one sliding cover. The at least one sliding cover is slidable relative to the sliding block, and each one of the at least one sliding cover has at least one limiting flange protruding from the sliding cover to limit the sliding range of the at least one sliding block relative to the sliding cover.

27 Claims, 22 Drawing Sheets

ADAPTIVE BEARING ENERGY ABSORBER

BACKGROUND OF THE INVENTION

1. Field of the Invention

The present invention relates to an energy absorber, and more particularly to an adaptive bearing energy absorber; the stiffness, the damping effect and the deformation of the energy absorber can be controlled to provide an automatic adjustment function and adaptive characteristics to separately achieve optimum functions for multiple performance objects at multiple levels of vibrations.

2. Description of Related Art

Conventional energy absorbers are commonly mounted on large objects, such as buildings, bridges or machines to provide shock-absorbing and shock-suppressing effects to the objects and to absorb the energy and shocks generated during earthquakes. U.S. Pat. No. 5,655,756 (hereinafter referred to as the referenced case) discloses a conventional energy absorber (Lead Rubber Bearing, LRB) comprises a core post, two supporting boards, multiple metal layers, and multiple rubber layers. The supporting boards are mounted respectively on two ends of the core post, and are securely connected to the ground and a large object respectively. The metal layers and the rubber layers are alternately mounted between the supporting boards. When an earthquake occurs, a shock-absorbing effect can be provided by the deformations of the metal and the rubber layers to reduce the damage caused by the earthquake.

However, the core post of the conventional energy absorber of the referenced case is made of lead. The lead core post may be deformed during the earthquake to absorb the vibration energy of the earthquake, and the deformation of the lead core post will generate heat. Therefore, the temperature of the lead core post of the referenced case will rise to about 350° C., which exceeds the melting point of lead, about 327° C., by the repeated deformation during the earthquake, and the high temperature easily causes the melting of the lead core post, and lead is a toxic heavy metal that will impact the environment. Furthermore, the rubber layers and the lead core post of the conventional energy absorber are easily damaged in the overheating event. In addition, the high temperature also easily decreases the structural strength of the energy absorber, such that the shock-absorbing effect of the conventional energy absorber is also reduced. In addition, even if the temperature does not reach the melting point of lead, the materials (including lead and rubber) are also softened by the temperature, and this will reduce the structural strength and the shock-suppressing and shock-absorbing effects of the conventional energy absorber.

In view of the above-mentioned problems and shortcomings of the conventional energy absorber, the energy absorber that is made of lead has gradually been banned or renounced from use. It is that the world has tried thinking about other shock-absorbing materials or energy absorption mechanism by which it needs to solve the energy absorption, the environmental protection, and other issues. One of the solutions is to remove the lead core post, but the shock-absorbing effect is inadequate and this will cause the energy absorber to have too large displacement. If the conventional energy absorber is used with other dampers such as a hydraulic damper, the cost is expensive. In addition, it is not only cost-ineffective, but also requires a large space to accommodate the conventional energy absorber and the other dampers, and this will cause problems of use and needs to be improved.

To overcome the shortcomings, the present invention tends to provide an adaptive bearing energy absorber to mitigate or obviate the aforementioned problems.

SUMMARY OF THE INVENTION

The main objective of the invention is to provide an energy absorber that can improve the stiffness and the damping effect of the energy absorber and provides a fail-safe mechanism.

The adaptive bearing energy absorber has at least one core post, two supporting boards, multiple first material layers, and multiple second material layers. Each one of the at least one core post is composed of at least one sliding unit. At least one of the at least one sliding unit of each one of the at least one core post is a sliding assembly. Each one of the at least one sliding assembly has two ends, at least one sliding block, and at least one sliding cover. The at least one sliding cover is slidable relative to the sliding block, and each one of the at least one sliding cover has at least one limiting flange protruding from the sliding cover to limit the sliding range of the at least one sliding block relative to the sliding cover. The supporting boards are respectively mounted on the two ends of the at least one core post. The first material layers and the second material layers are alternately mounted between the two supporting boards and surround the at least one core post.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a first embodiment of an adaptive bearing energy absorber in accordance with the present invention is used on buildings, bridges, other large objects, facilities or equipments, and the adaptive bearing energy absorber comprises at least one core post 10, two supporting boards 30, multiple first material layers 40, and multiple second material layers 50.

Figure 1:
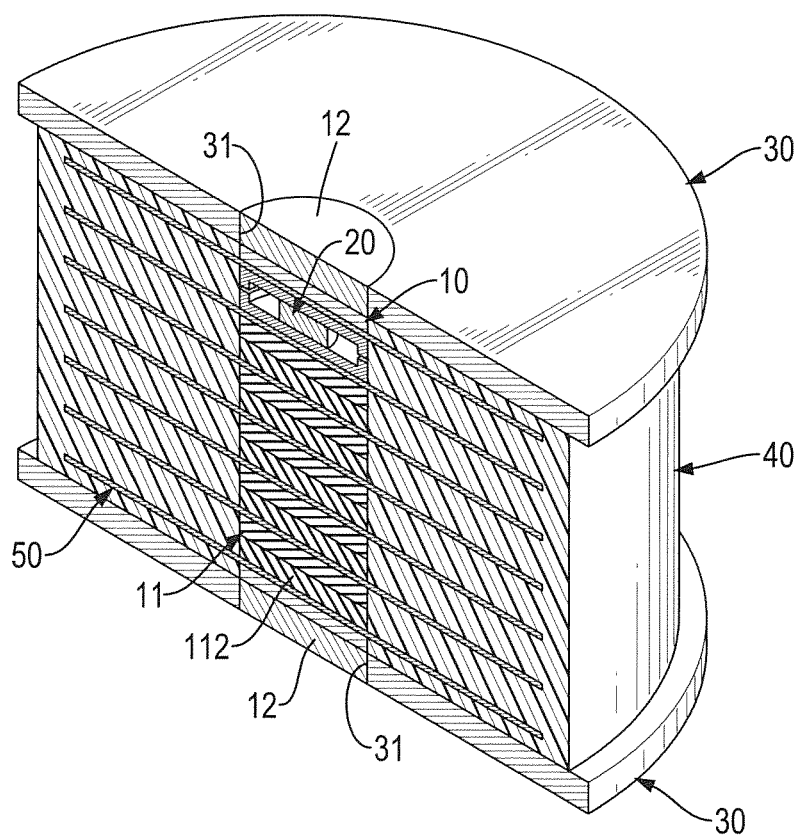
FIG. 1 is a cross sectional perspective view of a first embodiment of an adaptive bearing energy absorber in accordance with the present invention.
Figure 2:
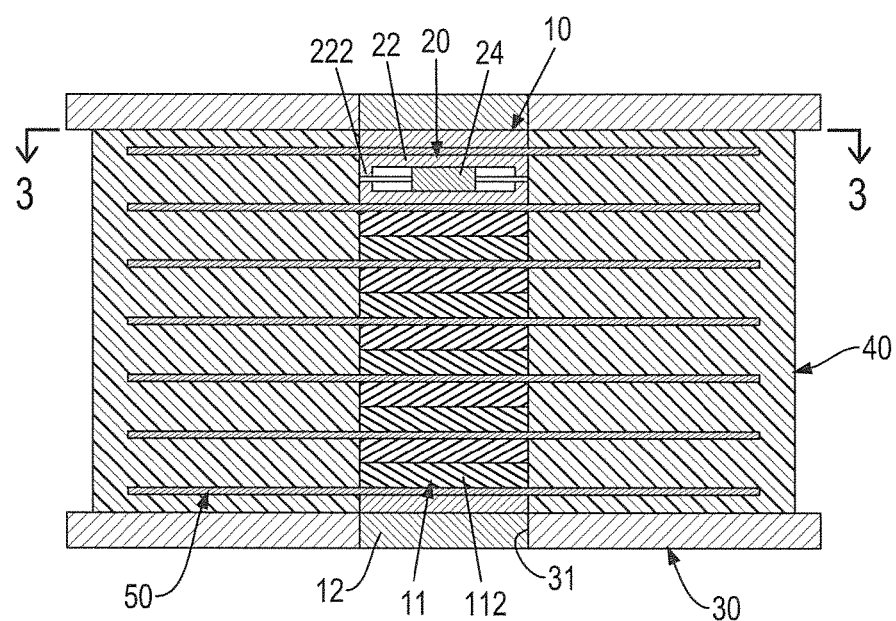
FIG. 2 is a cross sectional side view of the adaptive bearing energy absorber in FIG. 1.
Figure 3:
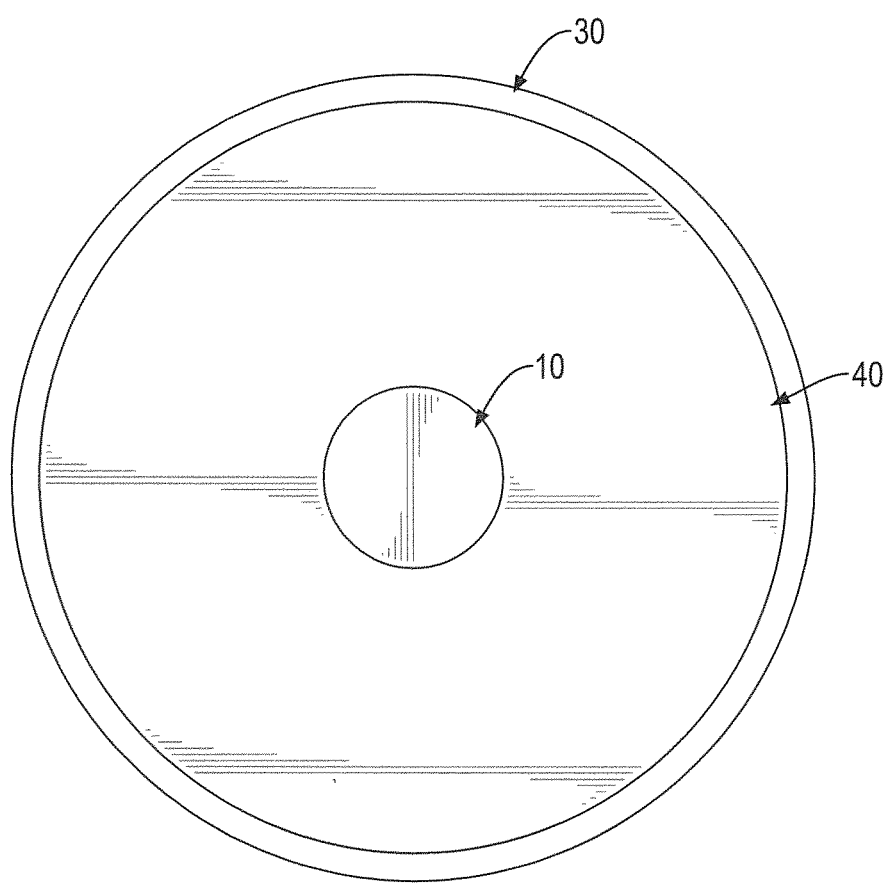
FIG. 3 is a cross sectional top view of the adaptive bearing energy absorber along the line 3-3 in FIG. 2.
Figure 5:
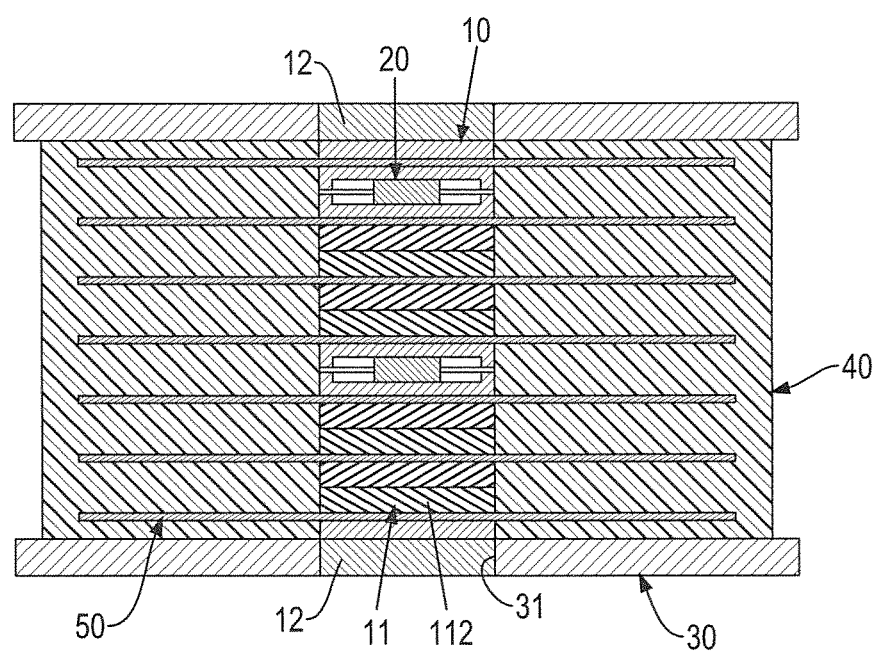
FIG. 5 is a cross sectional side view of a second embodiment of an adaptive bearing energy absorber in accordance with the present invention.
Figure 6:
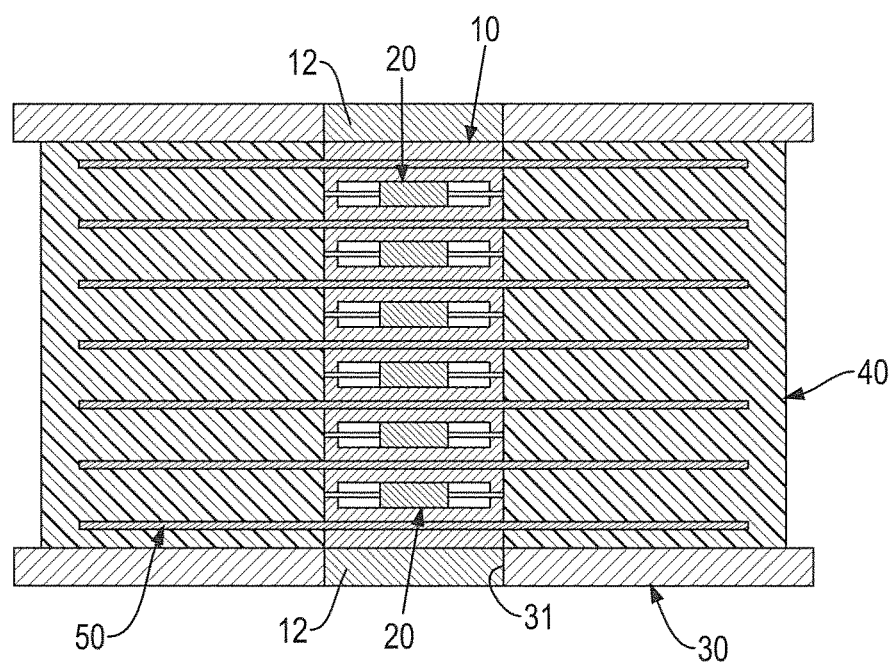
FIG. 6 is a cross sectional side view of a third embodiment of an adaptive bearing energy absorber in accordance with the present invention.

Each one of the at least one core post 10 has a cross section, two ends, and at least one sliding unit 11. The cross section of the core post 10 may be round, rectangular, square or in other geometric shapes. At least one of the at least one sliding unit 11 of each one of the at least one core post 10 is a sliding assembly 20. In the first embodiment as shown in FIG. 2, one sliding assembly 20 is implemented. In the second embodiment as shown in FIG. 5, two sliding assemblies 20 are implemented. In the third embodiment as shown in FIG. 6, multiple sliding assemblies 20 are implemented as the overall core post 10. In the first embodiment as shown in FIGS. 1 and 2, each sliding unit 11 other than the sliding assembly 20 is composed of at least one sliding sheet 112. The at least one sliding sheet 112 may be implemented as one that is slidable relative to the adjacent material layers 40,50 or may be implemented as two that are slidable relative to each other. The sliding sheets 112 may be made of the same or different hard materials such as iron, aluminum, copper or other metals, or are made of soft materials such as rubber, Polyoxymethylene (POM), Polyether Ether Ketone (PEEK), and Polymeric Materials. Preferably, the sliding sheets 112 are arranged in a stacked manner and are made of hard and soft materials. The sliding sheets 112 of each sliding unit 11 have a same thickness or different thicknesses. Preferably, each sliding unit 11 of the core post 10 can form a vertical stiffness to share a vertical load of the adaptive bearing energy absorber to adjust the damping and friction of each one of the sliding unit 11.

Figure 7:
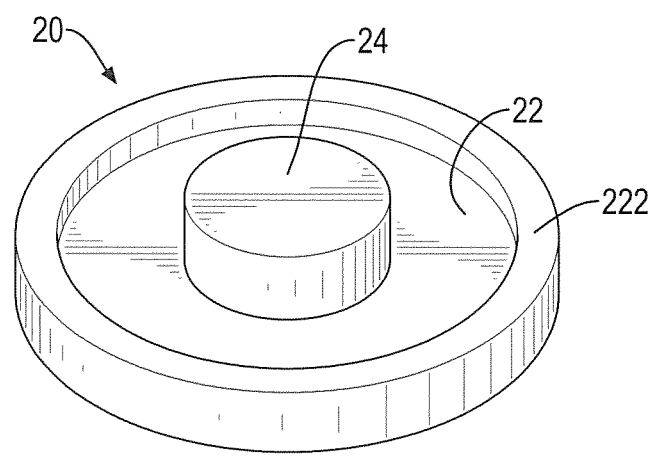
FIG. 7 is a perspective view of a first embodiment of a sliding assembly of an adaptive bearing energy absorber in accordance with the present invention.

With reference to FIGS. 1, 2, 5, and 6, each one of the at least one sliding assembly 20 comprises two sliding covers 22 and one sliding block 24 mounted between the sliding covers 22. The sliding block 24 is slidable relative to the sliding covers 22. Each sliding cover 22 has a limiting flange 222 formed on and protruding from the sliding cover 22 at a side facing the sliding block 24 and mounted around the sliding block 24. With reference to FIG. 7, the sliding block 24 and the sliding covers 22 are round in section, and the limiting flange 222 on each sliding cover 22 is annular and is mounted around the sliding block 24. With the arrangement of the limiting flanges 222 on the sliding covers 22, the sliding range of the sliding block 24 relative to the sliding covers 22 can be limited. Alternatively, the sliding assembly 20 may comprise one sliding cover 22 and one sliding block 24 mounted above or below the sliding cover 22 and surrounded by the limiting flange 222 on the sliding cover 22.

The two supporting boards 30 are respectively connected to the ends of the core post 10, are parallel with each other at an interval, and each one of the supporting boards 30 may be round, rectangular, square or in any possible shapes. The two supporting boards 30 are respectively connected to the ground or a floor and a large object, such as a building, a bridge or a machine by bolts, welding or riveting. Each one of the supporting boards 30 has a center and a receiving hole 31. The receiving hole 31 is formed through the center of the supporting board 30 and corresponding to and receiving one of the ends of the core post 10 or an end cover 12 inside.

The first material layers 40 and second material layers 50 are alternately mounted between the supporting boards 30 and surround the core post 10, and are alternately adjacent to the sliding units 11 of the core post 10. Each one of the first material layers 40 and the second material layers 50 has a shape corresponding to that of the supporting boards 30 and may be round, rectangular, square and in any possible shape. Alternatively, each one of the first material layers 40 and the second material layers 50 has a shape different from that of the supporting boards 30. For example, each one of the supporting boards 30 may be square, and each one of the first material layers 40 and the second material layers 40 may be round. The first material layers 40 and the second material layers 50 are made of flexible materials that are different from each other. Preferably, the first material layers 40 may be made of rubber, metal or composite materials. The second material layers 50 may be made of metal, rubber or composite materials. In addition, the amount and the thicknesses of the sliding unit 11 of the core post 10 are the same as or different from the amount and the thicknesses of the material layers 40, 50. The end covers 12 may be made of deformable materials that are softer than the materials of the two supporting boards 30 to reduce the differences of the axial deformations of the core post 10 and the first and second material layers 40,50 generated by horizontal movements thereof. In the first embodiment as shown in FIGS. 1 to 4, the second material layers 50 extend into the core post 10, and each sliding unit 11 is mounted between two adjacent second material layers 50 or between one of the second material layers 50 and one of the supporting boards 30 in an alternate manner.

Figure 4:
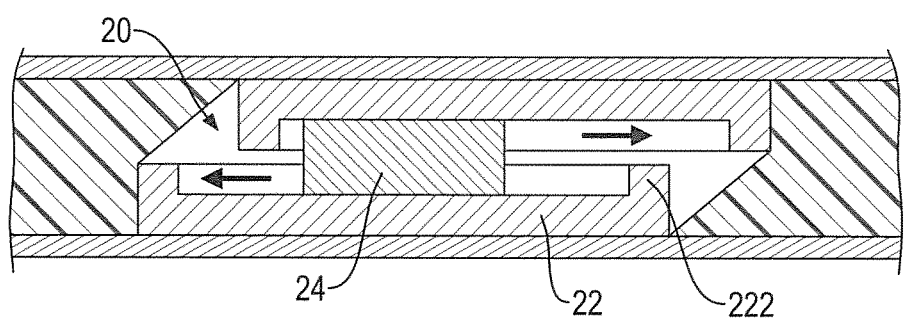
FIG. 4 is an enlarged operational cross sectional side view of the adaptive bearing energy absorber in FIG. 1.

Accordingly, with reference to FIGS. 2 and 4, the two supporting boards 30 are respectively connected to the ground or a floor and an object, the earthquake shock and energy can be efficiently absorbed and suppressed by the relative slides and frictions between the sliding sheets 112 of the sliding units 11 of the core post 10, between the sliding sheets 112 and the second material layers 50, and between the sliding covers 22 and the sliding block 24 and the deformation of the first and second material layers 40,50. The three-directional earthquake shock and energy can be kept from being transmitted to the object. Thus, an excellent shock-absorbing effect is provided to the object such as the buildings, bridges, facilities, or equipments to prevent the object from being damaged by earthquakes.

Because the core post 10 is formed by the stacked and non-lead sliding units 11, the temperature rise induced by the heat that is generated by the repeated deformation can be prevented from impairing the function of the core post 10 or even melting the core post 10 to cause a significant impact and pollution to the environment. In addition, the adaptive bearing energy absorber in accordance with the present invention can provide a sufficient damping effect to the object without connecting with other dampers such as a hydraulic damper in use. Then, the cost of using the energy absorber can be greatly reduced, and this is cost-effective, and it does not require additional space to install other dampers and this is convenient in use. Furthermore, the adaptive bearing energy absorber in accordance with the present invention has a fail-safe mechanism to prevent the energy absorber having an over deformation, such that the safety and function of the energy absorber can be improved. Each sliding unit 11 of the core post 10 can form a vertical stiffness to share a vertical load of the adaptive bearing energy absorber to adjust the damping and friction of each one of the sliding unit 11. The stiffness, the damping effect and the deformation of the energy absorber can be controlled to provide an automatic adjustment function and adaptive characteristics to separately achieve optimum functions for multiple performance objects at multiple levels of vibrations.

With reference to FIG. 4, with the limiting flanges 222 on the sliding covers 22, when a large earthquake occurs, the sliding range of the sliding block 24 can be limited by the abutment between the sliding block 24 and the limiting flanges 222 on the sliding covers 22. Accordingly, over deformations of the first material layers 40 and the second material layers 50 can be prevented, and the temperature of the energy absorber can be kept from rising highly. Thus, the energy absorber can be prevented from being damaged, and the horizontal stiffness and damping effect of the energy absorber can be improved. A fail-safe mechanism can be provided, and the energy absorbing and dissipating effect of the energy absorber can be enhanced.

Figure 8:
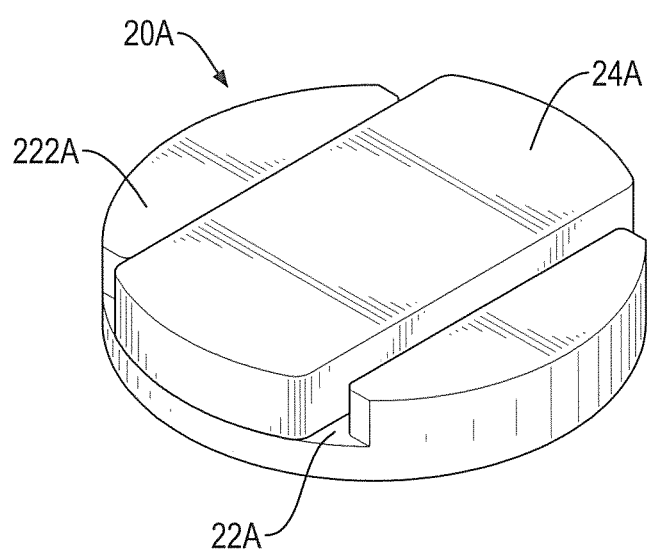
FIG. 8 is a perspective view of a second embodiment of a sliding assembly of an adaptive bearing energy absorber in accordance with the present invention.

With reference to FIG. 8, the sliding block 24A may be rectangular, square, hexagonal, oval, round or in any other geometric shape. The sliding cover 22A may be round, rectangular, oval, hexagonal or in any other geometric shape. The limiting flange 222A on each sliding cover 22A is divided into two segments respectively located around two sides of the sliding block 24A, such that the sliding range of the sliding block 24A in two horizontal directions can be different and effectively limited. Accordingly, the energy dissipating effects of the adaptive bearing energy absorber in the two horizontal directions can be automatically adjusted. In addition, the sliding assembly 20A may comprise two sliding covers 22A and a sliding block 24A mounted between the sliding covers 22A.

Figure 9:
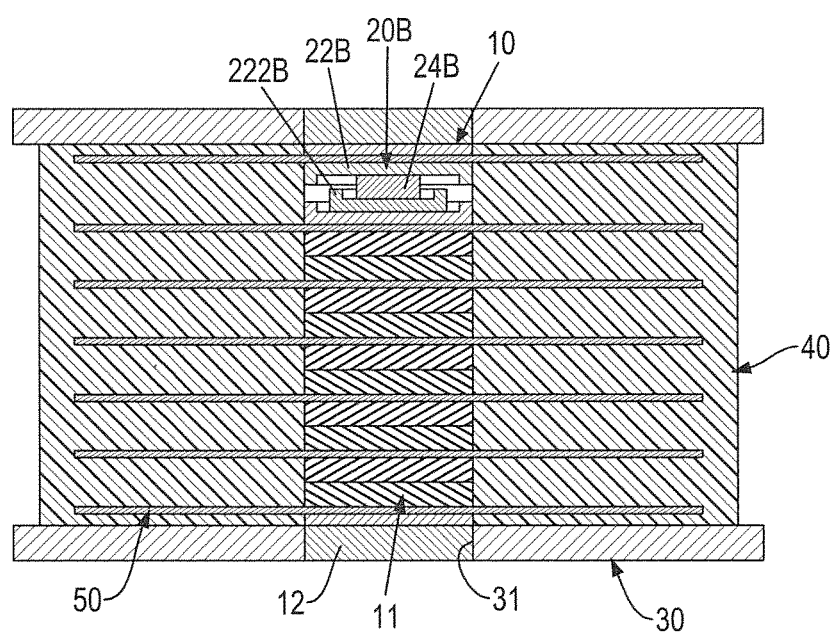
FIG. 9 is a cross sectional side view of an adaptive bearing energy absorber with a third embodiment of a sliding assembly in accordance with the present invention.
Figure 10:
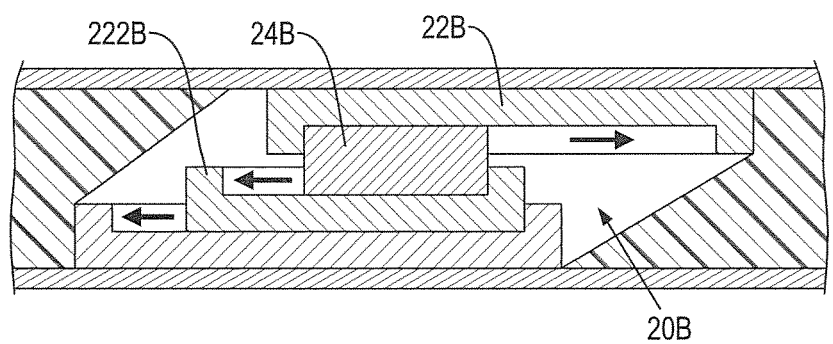
FIG. 10 is an enlarged cross sectional side view of the sliding assembly in FIG. 9.

With reference to FIGS. 9 and 10, the sliding assembly 20B may comprise three sliding covers 22B and a sliding block 24B. The sliding block 24B has two opposite side faces facing to different sliding covers 22B. Two of the sliding covers 22B are stacked with each other and are located at one of the side faces of the sliding block 24B, and the other one sliding cover 22B is located at the other side face of the sliding block 24B. The limiting flange 222B of each sliding cover 22B is formed on the sliding cover 22B at a side facing the sliding block 24B to limit the sliding range of the sliding block 24B relative to the sliding cover 22B. The sliding block 24B and the sliding covers 22B may be round in section as shown in FIG. 7. When the sliding block 24B is rectangular in section as shown in FIG. 8, the limiting flange 222B on each sliding cover 22B is divided into two segments respectively located around two sides of the sliding block 24B. The two stacked sliding covers 22B may be located above the sliding block 24B, and the other sliding cover 22B is located below the sliding block 24B. The limiting flange 222B on each sliding cover 22B is formed on the sliding cover 22B at a side facing the sliding block 24B and has the same function as each other. In other words, the two stacked sliding covers 22B are located at one of the side faces of the sliding block 24B, and the other sliding cover 24B is located at the other side face of the sliding block 24B. Each sliding cover 22B has a limiting flange 222B formed on the sliding cover 22B at a side facing the sliding block 24B.

Figure 11:
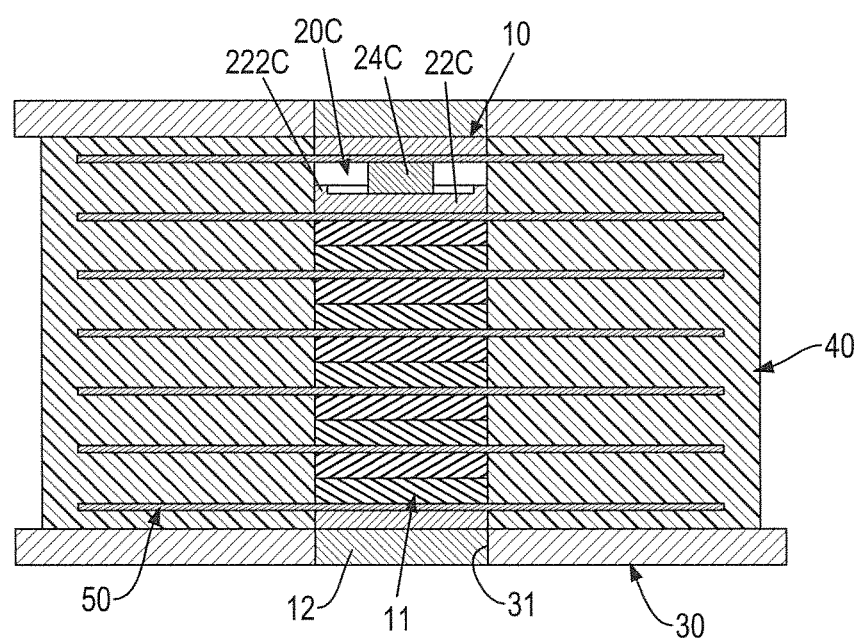
FIG. 11 is a cross sectional side view of an adaptive bearing energy absorber with a fourth embodiment of a sliding assembly in accordance with the present invention.
Figure 12:
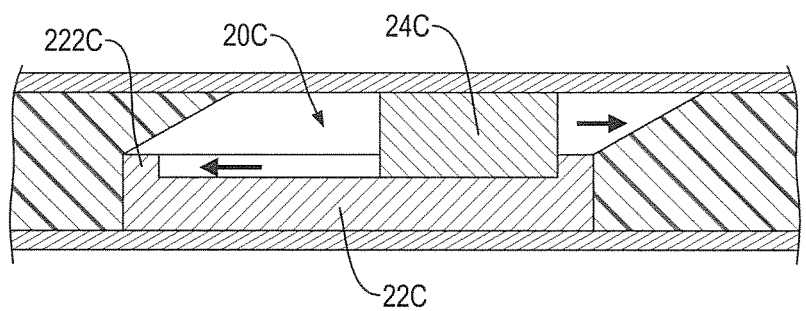
FIG. 12 is an enlarged cross sectional side view of the sliding assembly in FIG. 11.

With reference to FIGS. 11 and 12, the sliding assembly 20C may comprise one sliding cover 22C and one sliding block 24C. The sliding cover 22C and the sliding block 24C are adjacent respectively to the two material layers 40,50.

Figure 13:
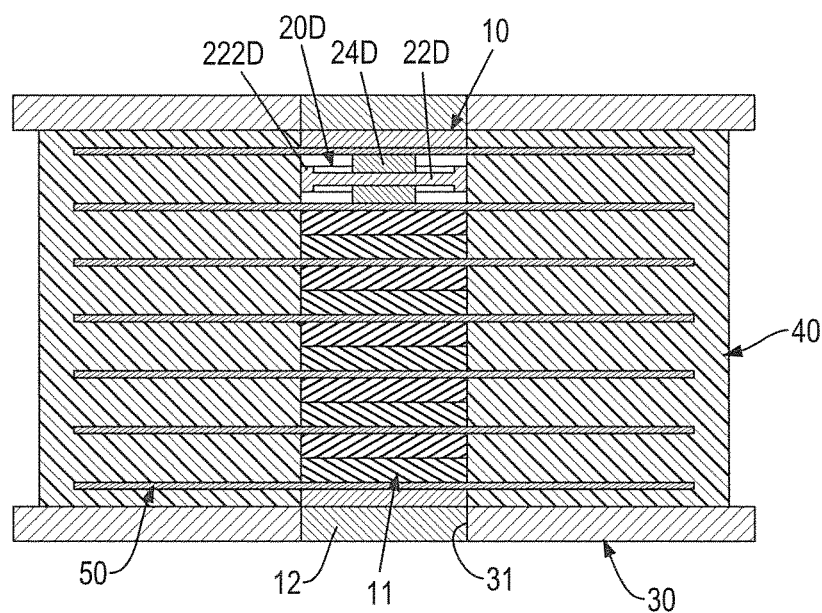
FIG. 13 is a cross sectional side view of an adaptive bearing energy absorber with a fifth embodiment of a sliding assembly in accordance with the present invention.
Figure 14:
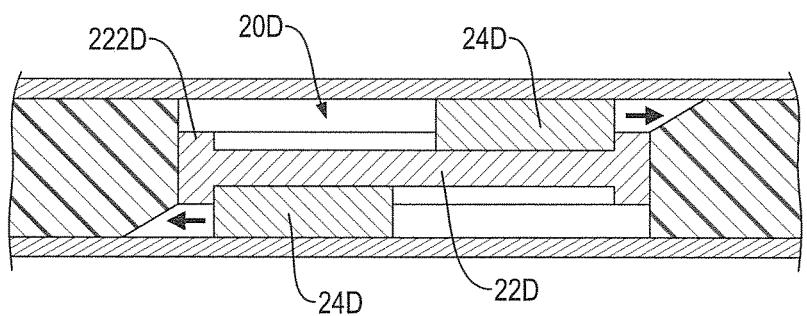
FIG. 14 is an enlarged cross sectional side view of the sliding assembly in FIG. 13.

With reference to FIGS. 13 and 14, the sliding assembly 20D may comprise two sliding blocks 24D and one sliding cover 22D mounted between the sliding blocks 24D. The sliding cover 22D has two limiting flanges 222D formed respectively on two sides of the sliding cover 22D facing the two sliding blocks 24D to limit the sliding range of the sliding blocks 24D.

Figure 15:
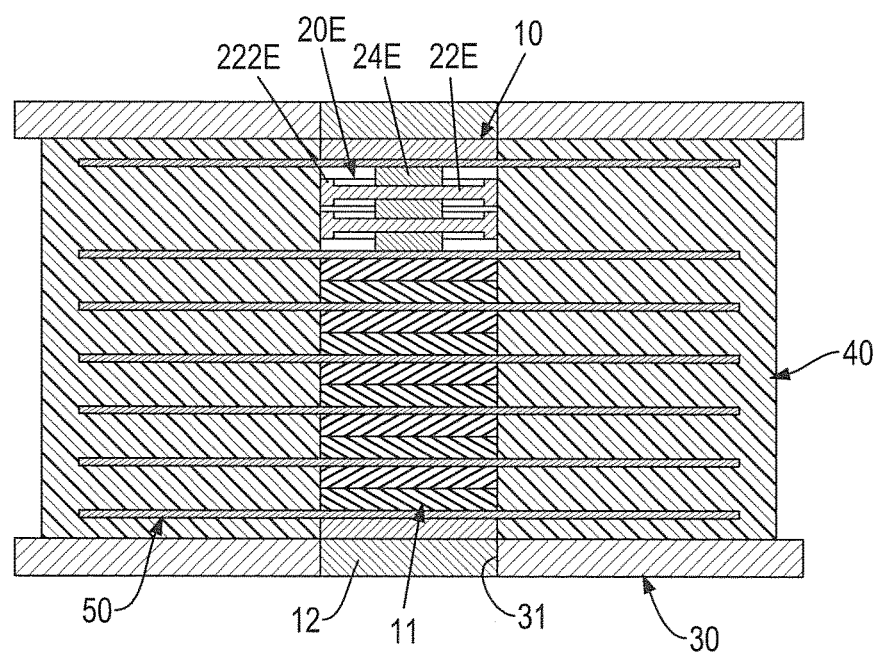
FIG. 15 is a cross sectional side view of an adaptive bearing energy absorber with a sixth embodiment of a sliding assembly in accordance with the present invention.
Figure 16:
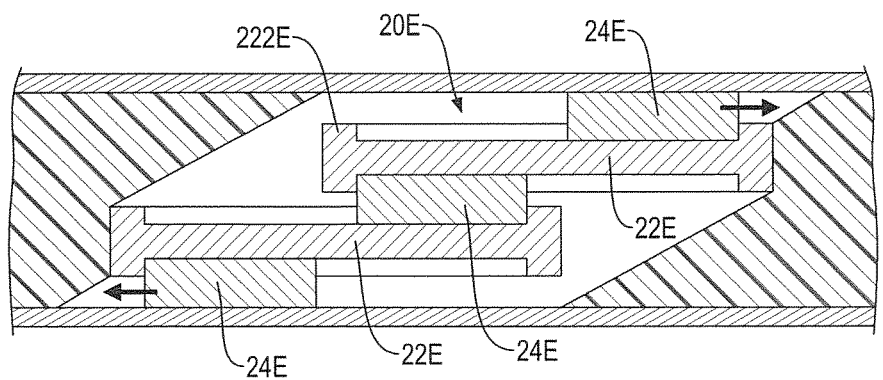
FIG. 16 is an enlarged cross sectional side view of the sliding assembly in FIG. 15.

With reference to FIGS. 15 and 16, the sliding assembly 20E may comprise three sliding blocks 24E and two sliding covers 22E respectively mounted between the sliding blocks 24E alternately. Each sliding cover 22E has two limiting flanges 222E formed respectively on two sides of the sliding cover 22E facing two of the three sliding blocks 24E to limit the sliding range of corresponding sliding blocks 24E.

Figure 17:
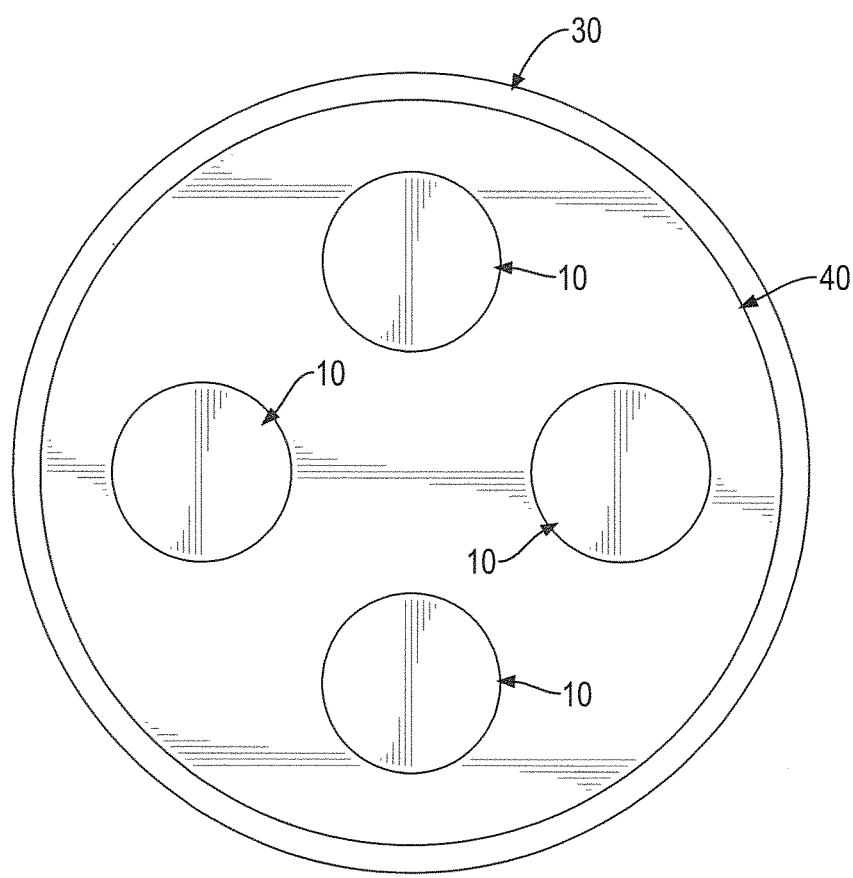
FIG. 17 is a cross sectional top view of a fourth embodiment of an adaptive bearing energy absorber in accordance with the present invention.

With reference to FIG. 17, multiple core posts 10 may be implemented in the adaptive bearing energy absorber, and preferably four core posts 10 are implemented. Accordingly, different energy absorbing and dissipating effects are provided for different needs, and the adaptive bearing energy absorber in accordance with the present invention is versatile in use. The sliding assemblies 20, 20A, 20B, 20C, 20D, 20E as shown in FIGS. 1 to 16 may be applied in the same core post 10 or different core posts 10.

Figure 18:
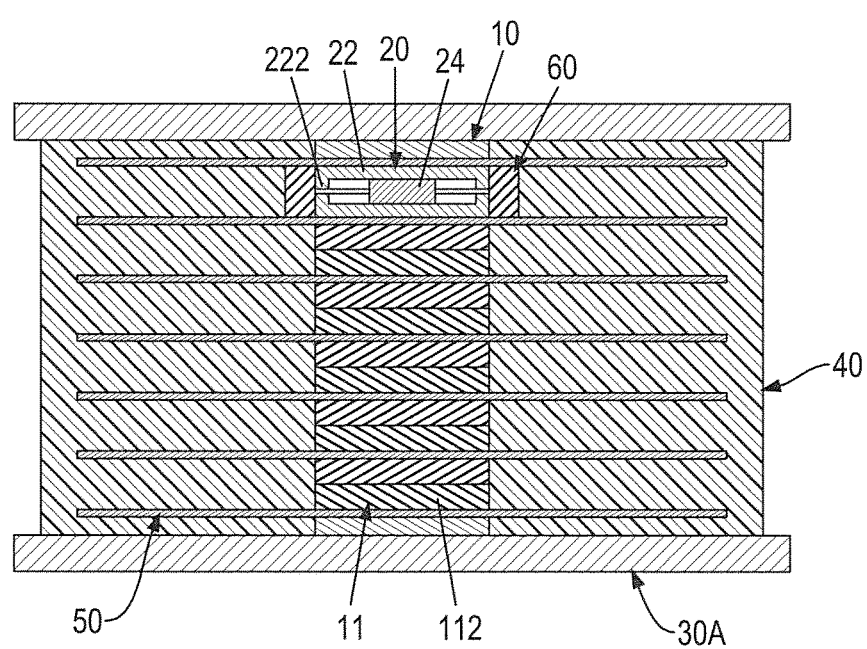
FIG. 18 is a cross sectional side view of a fifth embodiment of an adaptive bearing energy absorber in accordance with the present invention.

With reference to FIG. 18, in the fifth embodiment of the adaptive bearing energy absorber, the end covers 12 in the supporting boards 30 as shown in FIG. 1 can be omitted, and the supporting boards 30A are attached directly and close two ends of the core post 10. Thus, the structure of the energy absorber can be simplified. In addition, at least one restriction unit 60 is arranged respectively between the at least one core post 10 and the first and second material layers 40,50 and is mounted respectively around the at least one core post 10. The restriction unit 60 may be made of a deformable material to provide a restricting effect and a deforming space to the core post 10. Preferably, the restriction unit 60 may be a deformable material layer, a hollow sleeve or a spiral spring. Additionally, the restriction unit 60 is mounted around the sliding units 11.

Figure 19:
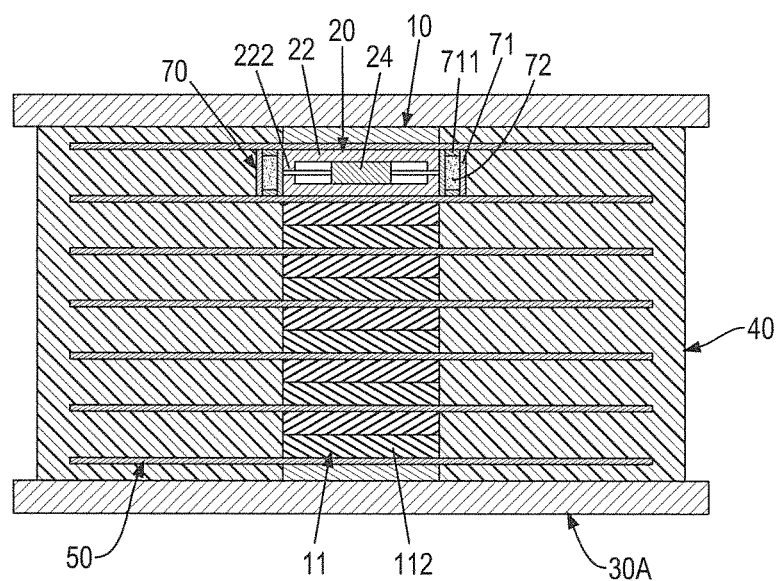
FIG. 19 is a cross sectional side view of a sixth embodiment of an adaptive bearing energy absorber in accordance with the present invention.

With reference to FIG. 19, in the sixth embodiment of the adaptive bearing energy absorber, the end covers 12 in the supporting boards 30 as shown in FIG. 1 can be omitted, and the supporting boards 30A are attached directly and close two ends of the core post 10. Thus, the structure of the energy absorber can be simplified. In addition, at least one cooling unit 70 is respectively mounted around the at least one core post 10 and between the supporting boards 30A. Each cooling unit 70 comprises a sealed tube 71 and coolant 72 filled in the sealed tube 71. The sealed tube 71 is hollow and is mounted around the core post 10, two ends of the sealed tube 71 are sealed respectively by sealing lids 711. The coolant 72 may be gas, liquid or a solid cooling agent. Accordingly, the temperature of the core post 10 and the whole energy absorber can be effectively reduced to prevent the core post 10 and the first and second material layers 40,50 from being damaged or melted due to high temperature. Consequently, the structural strength and the energy absorbing effect of the energy absorber can be enhanced.

Figure 20:
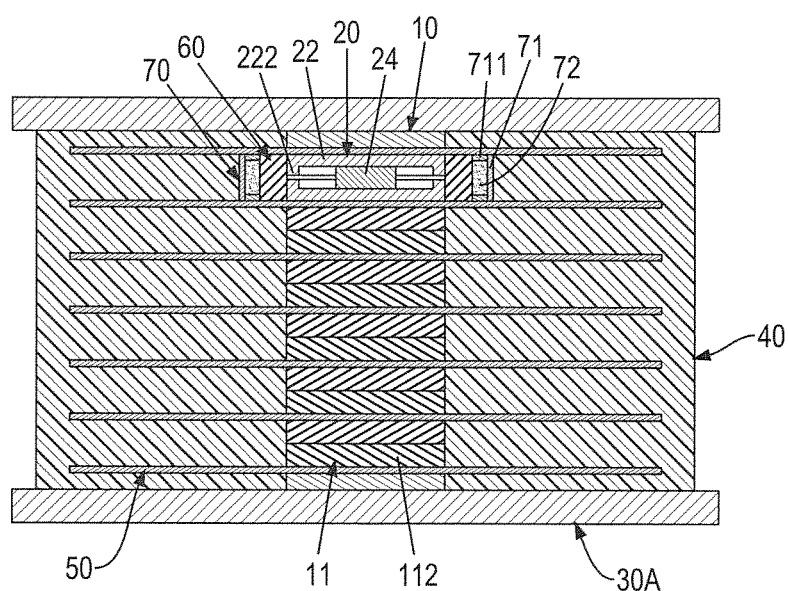
FIG. 20 is a cross sectional side view of a seventh embodiment of an adaptive bearing energy absorber in accordance with the present invention.

With reference to FIG. 20, in the seventh embodiment of the adaptive bearing energy absorber, the at least one cooling unit 70 is mounted respectively around the at least one restriction unit 60, such that the coolant 72 is arranged between the sealed tube 71 and the restriction unit 60. Accordingly, a restricting effect and a deforming space is provided to the sliding units 11 of the core post 10, and the temperature of the core post 10 and the whole energy absorber can be effectively reduced to prevent the core post 10 and the first and second material layers 40,50 from being damaged or melted due to high temperature.

Figure 21:
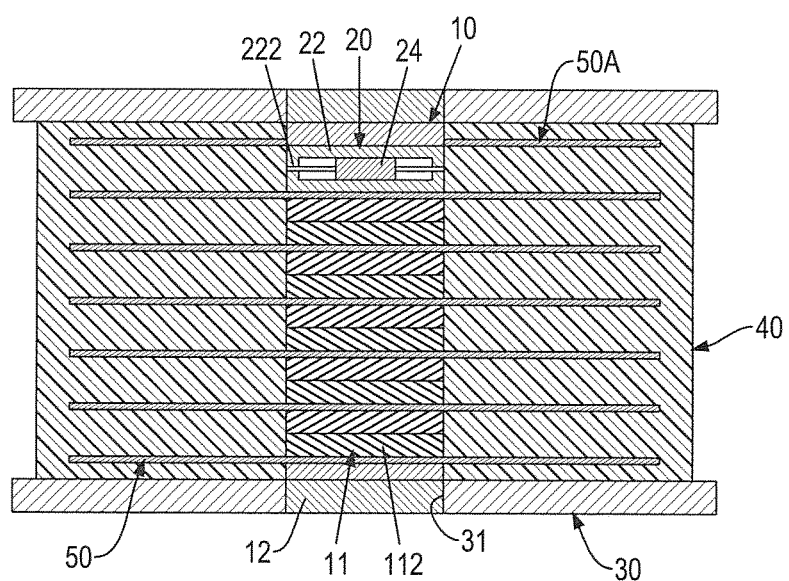
FIG. 21 is a cross sectional side view of an eighth embodiment of an adaptive bearing energy absorber in accordance with the present invention.

With reference to FIG. 21, in the eighth embodiment of the adaptive bearing energy absorber, at least one of the second material layers 50A is free from extending into the core post 10. The at least one sliding unit 11 is kept from being mounted between two adjacent second material layers 50A. Furthermore, all of the second material layers 50A are free from extending into the core post 11, and the sliding units 11 are stacked with each other in the core post 10.

Figure 22:
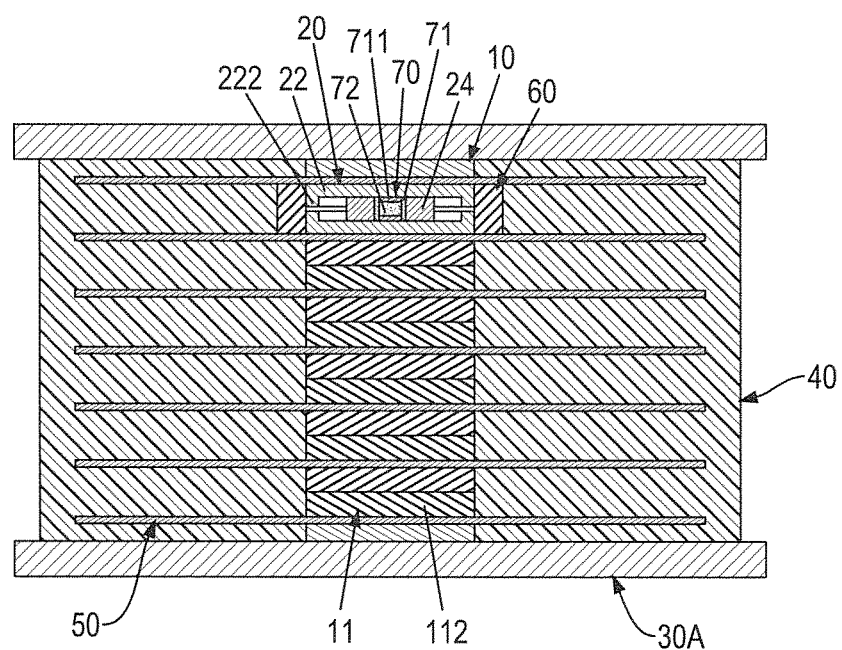
FIG. 22 is a cross sectional side view of a ninth embodiment of an adaptive bearing energy absorber in accordance with the present invention.

With reference to FIG. 22, in the ninth embodiment of the adaptive bearing energy absorber, a cooling unit 70 is mounted between the sliding covers 22 of each sliding assembly 20 of each core post 10. The cooling unit 70 comprises a sealed tube 71 and coolant 72 filled in the sealed tube 71. The sealed tube 71 is hollow and is mounted through the at least one sliding block 24 of the sliding assembly 20, and two ends of the sealed tube 71 is sealed respectively by sealing lids 711. The coolant 72 may be gas, liquid or a solid cooling agent. Accordingly, the temperature of the core post 10 and the whole energy absorber can be effectively reduced to prevent the core post 10 and the first and second material layers 40,50 from being damaged or melted due to high temperature. Consequently, the structural strength and the energy absorbing effect of the energy absorber can be enhanced. Furthermore, the cooling unit 70 is mounted through all of the sliding units 11 and the first and second material layers 40,50.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the tell is in which the appended claims are expressed.

What is claimed is:

1. An adaptive bearing energy absorber comprising:
   two ends;
   at least one core post, each one of the at least one core post composed of at least one sliding unit, wherein at least one of the at least one sliding unit of each one of the at least one core post is a sliding assembly, and each one of the at least one sliding assembly comprises
      two ends;
      at least one sliding block; and
      at least one sliding cover being slidable relative to the sliding block, and each one of the at least one sliding cover having at least one limiting flange protruding from the sliding cover to limit the sliding range of the sliding block relative to the sliding cover;
   two supporting boards disposed on the two ends of the adaptive bearing energy absorber; and
   multiple first material layers and multiple second material layers, the first material layers and second material layers alternately mounted between the two supporting boards and surrounding the at least one core post.

2. The adaptive bearing energy absorber as claimed in claim 1, wherein each one of the at least one sliding assembly comprises two sliding covers and one sliding block slidably mounted between the sliding covers;
   the at least one limiting flange on each sliding cover of each one of the at least one sliding assembly is implemented as one in amount; and
   the limiting flange of each sliding cover of each one of the at least one sliding assembly is formed on the sliding cover at a side facing the sliding block of the sliding assembly and mounted around the sliding block of the sliding assembly.

3. The adaptive bearing energy absorber as claimed in claim 2, wherein
   the sliding block and the sliding covers of each one of the at least one sliding assembly are round in section; and
   the limiting flange on each sliding cover of each one of the at least one sliding assembly is annular and is mounted around the sliding block of the sliding assembly.

4. The adaptive bearing energy absorber as claimed in claim 2, wherein the limiting flange on each sliding cover of each one of the at least one sliding assembly is divided into two segments respectively located around two sides of the sliding block of the sliding assembly.

5. The adaptive bearing energy absorber as claimed in claim 1, wherein each one of the at least one sliding assembly comprises at least three sliding covers and at least one sliding block having two side faces;
   two of the at least three sliding covers of each one of the at least one sliding assembly are stacked with each other and are located at one of the side faces of the at least one sliding block of the sliding assembly, and the other at least one sliding cover of the sliding assembly is located at the other side face of the at least one sliding block of the sliding assembly;
   the at least one limiting flange on each sliding cover of each one of the at least one sliding assembly is implemented as one in amount; and
   the limiting flange of each sliding cover of each one of the at least one sliding assembly is formed on the sliding cover at a side facing the at least one sliding block of the sliding assembly and mounted around the at least one sliding block of the sliding assembly.

6. The adaptive bearing energy absorber as claimed in claim 5, wherein
   the at least one sliding block and the sliding covers of each one of the at least one sliding assembly are round in section; and
   the limiting flange on each sliding cover of each one of the at least one sliding assembly is annular and is mounted around the sliding block of the sliding assembly.

7. The adaptive bearing energy absorber as claimed in claim 5, wherein the limiting flange on each sliding cover of each one of the at least one sliding assembly is divided into two segments respectively located at two sides of the sliding block of the sliding assembly.

8. The adaptive bearing energy absorber as claimed in claim 1, wherein each one of the at least one sliding assembly comprises one sliding cover and one sliding block;
- the at least one limiting flange on the sliding cover of each one of the at least one sliding assembly is implemented as one in amount; and
- the limiting flange of the sliding cover of each one of the at least one sliding assembly is formed on the sliding cover at a side facing the sliding block of the sliding assembly and mounted around the sliding block of the sliding assembly.

9. The adaptive bearing energy absorber as claimed in claim 8, wherein
- the sliding block and the sliding cover of each one of the at least one sliding assembly are round in section; and
- the limiting flange on the sliding cover of each one of the at least one sliding assembly is annular and is mounted around the sliding block of the sliding assembly.

10. The adaptive bearing energy absorber as claimed in claim 8, wherein the limiting flange on the sliding cover of each one of the at least one sliding assembly is divided into two segments respectively located at two sides of the sliding block of the sliding assembly.

11. The adaptive bearing energy absorber as claimed in claim 1, wherein each one of the at least one sliding assembly comprises at least two sliding blocks and at least one sliding cover mounted between the at least two sliding blocks; and
- each one of the at least one sliding cover of each one of the at least one sliding assembly has two limiting flanges formed respectively on two sides of the sliding cover facing the at least two sliding blocks to limit the sliding range of the at least two sliding blocks of the sliding assembly.

12. The adaptive bearing energy absorber as claimed in claim 11, wherein
- the sliding blocks and the at least one sliding cover of each one of the at least one sliding assembly are round in section; and
- the limiting flanges on each one of the at least one sliding cover of each one of the at least one sliding assembly are annular and are mounted around a corresponding one of the sliding blocks of the sliding assembly.

13. The adaptive bearing energy absorber as claimed in claim 11, wherein each limiting flange on each one of the at least one sliding cover of each one of the at least one sliding assembly is divided into two segments respectively located at two sides of the corresponding one of the sliding blocks of the sliding assembly.

14. The adaptive bearing energy absorber as claimed in claim 1, wherein each one of the at least one sliding assembly comprises three sliding blocks and two sliding covers respectively mounted between the sliding blocks alternately; and
- each sliding cover of each one of the at least one sliding assembly has two limiting flanges formed respectively on two sides of the sliding cover facing two of the three sliding blocks to limit the sliding range of corresponding two of the sliding blocks of the sliding assembly.

15. The adaptive bearing energy absorber as claimed in claim 14, wherein
- the sliding blocks and the sliding covers of each one of the at least one sliding assembly are round in section; and
- the limiting flanges on each sliding cover of each one of the at least one sliding assembly are annular and are mounted around a corresponding one of the sliding blocks of the sliding assembly.

16. The adaptive bearing energy absorber as claimed in claim 14, wherein each limiting flange on each sliding cover of each one of the at least one sliding assembly is divided into two segments respectively located at two sides of a corresponding one of the sliding blocks of the sliding assembly.

17. The adaptive bearing energy absorber as claimed in claim 1, wherein each one of the at least one limiting flange of each one of the at least one sliding cover of each one of the at least one sliding assembly is formed on the sliding cover at a side facing a corresponding one of the at least one sliding block of the sliding assembly.

18. The adaptive bearing energy absorber as claimed in claim 17, wherein
- the at least one sliding block and the at least one sliding cover of each one of the at least one sliding assembly are round in section; and
- the limiting flange on each one of the at least one sliding cover of each one of the at least one sliding assembly is annular and is mounted around the corresponding one of the at least one sliding block of the sliding assembly.

19. The adaptive bearing energy absorber as claimed in claim 17, wherein the limiting flange on each one of the at least one sliding cover of each one of the at least one sliding assembly is divided into two segments respectively located at two sides of the corresponding one of the at least one sliding block of the sliding assembly.

20. The adaptive bearing energy absorber as claimed in claim 1 further comprising at least one restriction unit; and each one of the at least one restriction unit is arranged between a corresponding one of the at least one core post and the first and second material layers and is mounted around the corresponding one of the at least one core post.

21. The adaptive bearing energy absorber as claimed in claim 20 further comprising at least one cooling unit; and each one of the at least one cooling unit is mounted around a corresponding one of the at least one restriction unit.

22. The adaptive bearing energy absorber as claimed in claim 20, wherein each one of the at least one sliding assembly of each one of the at least one core post further comprises a cooling unit.

23. The adaptive bearing energy absorber as claimed in claim 1, wherein the at least one sliding unit of each one of the at least one core post, the first material layers and the second material layers are alternately mounted between the two supporting boards.

24. The adaptive bearing energy absorber as claimed in claim 1, wherein each one of the at least one sliding assembly of each one of the at least one core post further comprises a cooling unit.

25. The adaptive bearing energy absorber as claimed in claim 1 further comprising at least one cooling unit; and each one of the at least one cooling unit is arranged between a corresponding one of the at least one core post and the first and second material layers and is mounted around the corresponding one of the at least one core post.

26. The adaptive bearing energy absorber as claimed in claim 25, wherein each one of the at least one sliding assembly of each one of the at least one core post further comprises a cooling unit.

27. The adaptive bearing energy absorber as claimed in claim 1, wherein the at least one sliding unit of each one of the at least one core post forms a vertical stiffness to share a vertical load of the adaptive bearing energy absorber to adjust friction of the at least one sliding unit of each one of the at least one core post.

* * * * *